US011295036B2

United States Patent
Young et al.

(10) Patent No.: US 11,295,036 B2
(45) Date of Patent: Apr. 5, 2022

(54) METHOD OF USING PROTOCOL CRC TO IMPLEMENT END TO END PROTECTION OF A CAN MESSAGE

(71) Applicant: NXP USA, Inc., Austin, TX (US)

(72) Inventors: Alison Young, Glasgow (GB); Alan Devine, Paisley (GB); Andrew Edward Birnie, Bearsden (GB)

(73) Assignee: NXP USA, Inc., Austin, TX (US)

( * ) Notice: Subject to any disclaimer, the term of this patent is extended or adjusted under 35 U.S.C. 154(b) by 381 days.

(21) Appl. No.: 16/707,357

(22) Filed: Dec. 9, 2019

(65) Prior Publication Data
US 2021/0173961 A1    Jun. 10, 2021

(51) Int. Cl.
| | |
|---|---|
| *G06F 21/64* | (2013.01) |
| *H04L 29/06* | (2006.01) |
| *H04L 49/90* | (2022.01) |
| *H04L 69/324* | (2022.01) |
| *H04L 12/40* | (2006.01) |
| *H04L 1/00* | (2006.01) |

(52) U.S. Cl.
CPC ............ *G06F 21/64* (2013.01); *H04L 1/0061* (2013.01); *H04L 12/40013* (2013.01); *H04L 49/90* (2013.01); *H04L 63/168* (2013.01); *H04L 69/324* (2013.01)

(58) Field of Classification Search
CPC ..... H04L 1/0061; H04L 63/12; H04L 63/123; H04L 69/324; H04L 63/1408; G06F 11/1048; G06F 21/64
See application file for complete search history.

(56) References Cited

U.S. PATENT DOCUMENTS

| | | | |
|---|---|---|---|
| 6,085,248 A * | 7/2000 | Sambamurthy | H04L 29/06 710/1 |
| 6,999,824 B2 | 2/2006 | Glanzer et al. | |
| 2008/0274689 A1* | 11/2008 | Kuban | H04L 12/4625 455/7 |
| 2011/0004816 A1 | 1/2011 | Wood et al. | |
| 2014/0223258 A1 | 8/2014 | Hartwich et al. | |
| 2016/0197944 A1 | 7/2016 | Allouche et al. | |

(Continued)

OTHER PUBLICATIONS

Mehrnoush Rahmani et al., Error Detection Capabilities of Automotive Network Technologies and Ethernet—A Comparative Study, Proceedings of the 2007 IEEE Intelligent Vehicles Symposium, Istanbul, Turkey, Jun. 13-15, 2007.

(Continued)

*Primary Examiner* — Shelly A Chase

(57) ABSTRACT

A system, method, and apparatus are provided for processing packets received over Controller Area Network (CAN) interface where a CAN protocol controller computes a CRC value from header and payload values in a received CAN data frame to verify frame integrity of the received CAN data frame across a physical media layer, and then stores the header and payload values and the CRC value in a memory buffer of the CAN protocol controller so that a host core can compute a reconstructed CRC value from the header and payload values retrieved from the memory buffer, and then compare the reconstructed CRC value to the CRC value retrieved from the memory buffer to verify frame integrity of the received CAN data frame at a transaction layer.

20 Claims, 7 Drawing Sheets

(56) References Cited

U.S. PATENT DOCUMENTS

2016/0342531 A1   11/2016  Sharma
2016/0344552 A1*  11/2016  Sharma ............... H04L 63/1408
2017/0109309 A1   4/2017  van de Burgt et al.
2017/0134394 A1   5/2017  Xu et al.
2018/0039538 A1*  2/2018  Freikorn ............. G06F 11/1048

OTHER PUBLICATIONS

NXP Semiconductors, TJA1145, High-speed CAN transceiver for partial networking, Product Data Sheet, Rev. 4, May 9, 2018, 57 pages.

* cited by examiner

METHOD OF USING PROTOCOL CRC TO IMPLEMENT END TO END PROTECTION OF A CAN MESSAGE

BACKGROUND OF THE INVENTION

Field of the Invention

The present disclosure is directed in general to field of data communications. In one aspect, the present disclosure relates to a system for protecting the integrity of data communications between networked electronic control units.

Description of the Related Art

Automotive vehicles increasingly include integrated circuit computer systems—such as electronic control units (ECUs), microcontrollers (MCUs), power train control modules (PCM), System(s)-on-a-Chip (SoC), and System(s)-in-a-Package (SiP)—that are connected together over a network or system bus to form an automotive vehicle network. For example, a controller area network (CAN) bus is a message-based communications bus protocol that is often used within automobiles to enable communications between various electronic control units (ECUs) which perform various control applications, such as for airbags, antilock brakes, cruise control, electric power steering, audio systems, windows, doors, mirror adjustment, battery and recharging systems for hybrid/electric cars, and many more. As will be appreciated, different applications have different levels of data safety requirements which can present data integrity challenges for computer systems running the applications. For example, a microcontroller unit may be used to control an automatic braking application which processes data having the highest Automotive Safety Integrity Level (ASIL) level (e.g., ASIL D) such that the data integrity must be ensured.

While there are solutions for protecting data integrity in sections of the vehicle network, such solutions do not provide end-to-end protection for data communications, particularly for applications (e.g., ASIL D) where a high level of safety is required. For example, the data link layer specified in the CAN protocol (International Standards Organization 11898-1:2015) provides data integrity protection with a cyclic redundancy check (CRC) code that is checked in hardware to determine the integrity of the frame over the physical media (Data Link Layer), but this protection does not extend to the upper layers (e.g., Application Layer). To protect data frames in the upper layers, a CRC code could be inserted in the CAN payload data which covers both the CAN header and payload. However, there are fixed function nodes, such as sensors, that are not capable of embedding a CRC into the frame's payload. And even where it is possible to insert an additional CRC, this would reduce the bandwidth available to functional data and would also increase the processing required at the creating and consuming nodes on the network. Another possible solution would be to include redundancy in the design of all the hardware elements which modify and/or store the message, but this solution would add significant overhead to the design, increase the die size, and impose greater power consumption. As seen from the foregoing, the existing solutions for protecting the integrity of data communications are extremely difficult at a practical level by virtue of the challenges with meeting the performance requirements and cost constraints for providing data protections across the entire automotive vehicle network.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
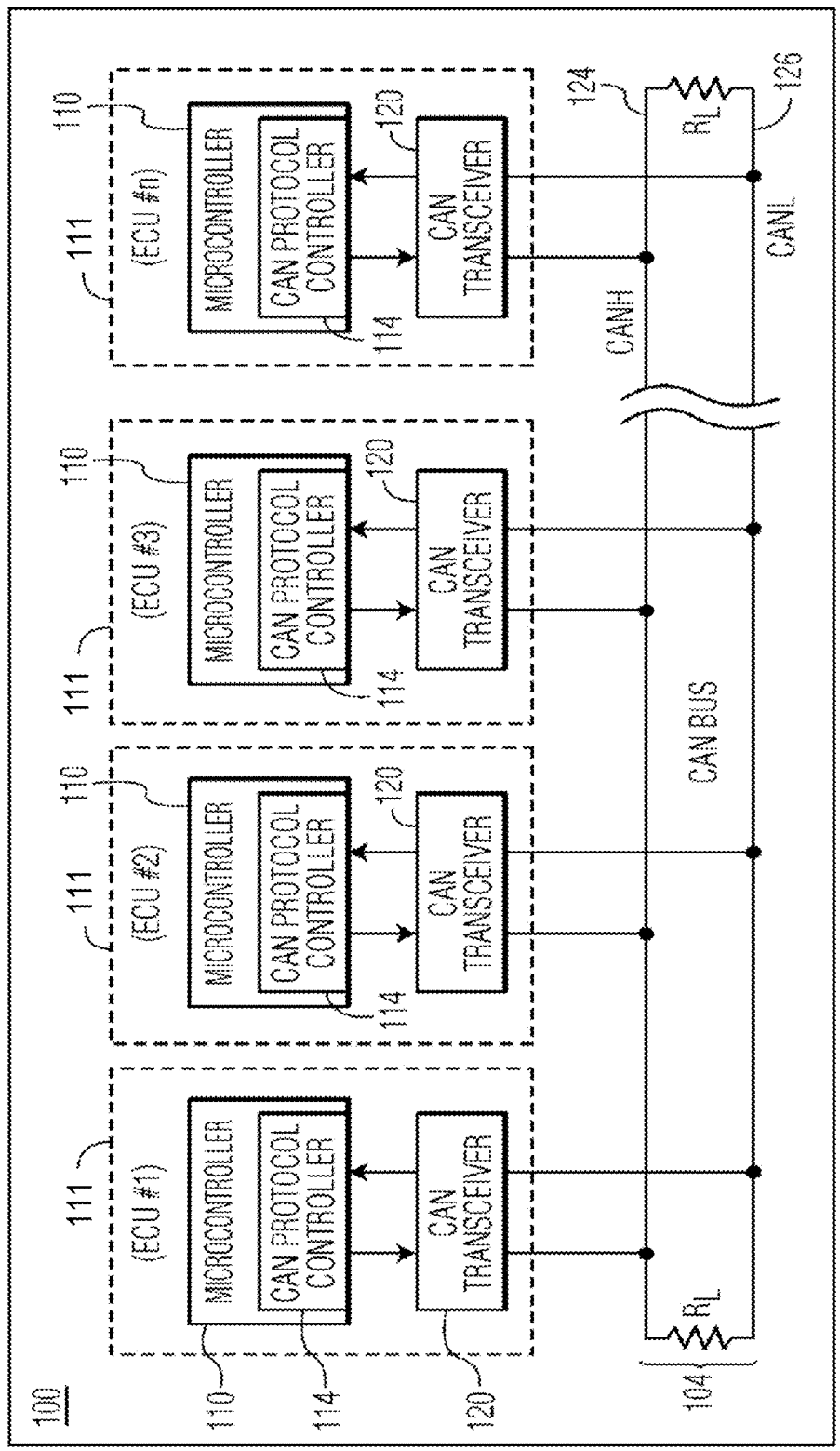
FIG. 1 depicts a simplified block diagram of a CAN network that includes multiple CAN nodes connected to a CAN bus.

An apparatus, system, architecture, methodology, and program code are described wherein a host retrieves a CAN protocol CRC for comparison with a reconstructed CAN protocol data frame for verification processing at an upper or application layer, thereby using a CAN protocol CRC to implement end-to-end data integrity protection of a CAN message. In selected data reception embodiments, a CAN protocol controller generates a protocol CRC in the course of verifying a received message/frame, but instead of discarding the protocol CRC when the frame/message is received, the CAN protocol controller stores the CAN protocol CRC in memory, alone or in combination with the CAN header and payload data. This may be accomplished by making the protocol CRC (part of CAN standard) available for comparison with a CRC calculated by the ASILD host core by protecting the CRC data as it travels from the CAN controller to the ASILD island. In selected embodiments, the CAN header, payload, and protocol CRC are stored after removing the start-of-field and any stuff bit data. Subsequently, the processing element (e.g., host core) can retrieve the protocol CRC to check the message/frame at the point of consumption (e.g., at the application layer), thereby providing an additional data integrity check of the received message/frame without needing to embed a CRC in the payload of the frame. In selected embodiments, the processing element rechecks the CRC prior to consumption by reconstructing the message/frame to match the format (including reconstructed CRC) of the frame at CAN protocol controller, and then comparing the reconstructed CRC to the protocol CRC to verify the integrity of the data. In selected embodiments, the reconstructed message/frame includes the CAN header, payload, and CRC, along with start-of-field and any stuff bit data. To determine which message/frames require additional integrity checks, the processing element and/or CAN protocol controller may use a hardware look up table to quickly identify the frames to be protected by the protocol CRC. In other data transmission embodiments, processing element can use the protocol CRC to check the integrity of transmitted CAN frames. To this end, the processing element first creates a complete CAN message/frame, including pre-calculating the protocol CRC over the frame, prior to sending a CAN frame for transmission by the CAN protocol controller. By storing the pre-calculated protocol CRC in system memory, the processing element can then check the CRC generated by the CAN protocol controller transmit logic against the pre-calculated protocol CRC to verify data integrity of the transmitted data. Generally speaking, the disclosed apparatus, system, architecture, methodology, and program code provide a mechanism for using the protocol CRC to protect the integrity of the data as it travels from the CAN controller to the ASILD processing island (e.g., host processing core).

As described hereinbelow, the disclosed embodiments can be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. Furthermore, the described features, advantages, and characteristics of the invention may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments. In addition, it will be appreciated that the techniques described herein can be applied to any type of computer network system, including but not limited to computer systems connected in an in-vehicle network (IVN), Controller Area Network (CAN), a Local Interconnect Network (LIN), an Ethernet network, and the like. Although in some embodiments a specific type of CAN is described, it should be noted that the embodiments are not restricted to a specific type of CAN.

To provide additional details for an improved contextual understanding of the present disclosure, reference is now made to FIG. 1 which depicts a simplified block diagram of a CAN network 100 that includes multiple CAN nodes 111 (a.k.a., ECU #1-ECU #n) connected to a CAN bus 104. As depicted, each CAN node 111 includes a microcontroller 110 having an embedded CAN protocol controller 114 and a CAN transceiver 120. Each microcontroller 110 contains one or more host cores and is configured to support application software that interacts with the CAN protocol controller 114. In addition, each microcontroller 110 is typically connected to at least one device (not shown) such as a sensor, an actuator, or some other control device and are programmed to determine the meaning of received messages and to generate appropriate outgoing messages.

The CAN protocol controllers 114, which can be embedded within the microcontrollers 110 or external to the microcontrollers (e.g., a separate IC device), include hardware logic and memory buffers for implementing data link layer transmit and receive operations as is known in the field. For example, in receive operations, a CAN protocol controller 114 stores received serial bits from the transceiver until an entire message is available for fetching by the microcontroller. The CAN protocol controller 114 can also decode the CAN messages according to the standardized frame format of the CAN protocol. In transmit operations, the CAN protocol controller 114 receives messages from the microcontroller 110 and transmits the messages as serial bits in the CAN data frame format to the CAN transceiver 120.

The CAN transceivers 120 are located between the microcontrollers 110 and the CAN bus 104 and implement physical layer operations. For example, in receive operations, a CAN transceiver 120 converts analog differential signals from the CAN bus 104 to serial digital signals that the CAN protocol controller 114 can interpret. The CAN transceiver 120 also protects the CAN protocol controller 114 from extreme electrical conditions on the CAN bus 104, such as electrical surges. In transmit operations, the CAN transceiver 120 converts serial digital bits received from the CAN protocol controller 114 into analog differential signals that are sent on the CAN bus 104.

The CAN bus 104 carries analog differential signals and includes a CAN high (CAHN) bus line 124 and a CAN low (CANL) bus line 126. The CAN bus 104 is known in the field, and may operate in accordance with the ISO 11898-1 protocol for normal operations on the data link layer which includes the CAN Flexible Data-Rate ("CAN FD") definition for the data link layer. Accordingly, the CAN protocol controller 114 can be configured to support the normal mode or the flexible data rate mode.

Figure 2A:
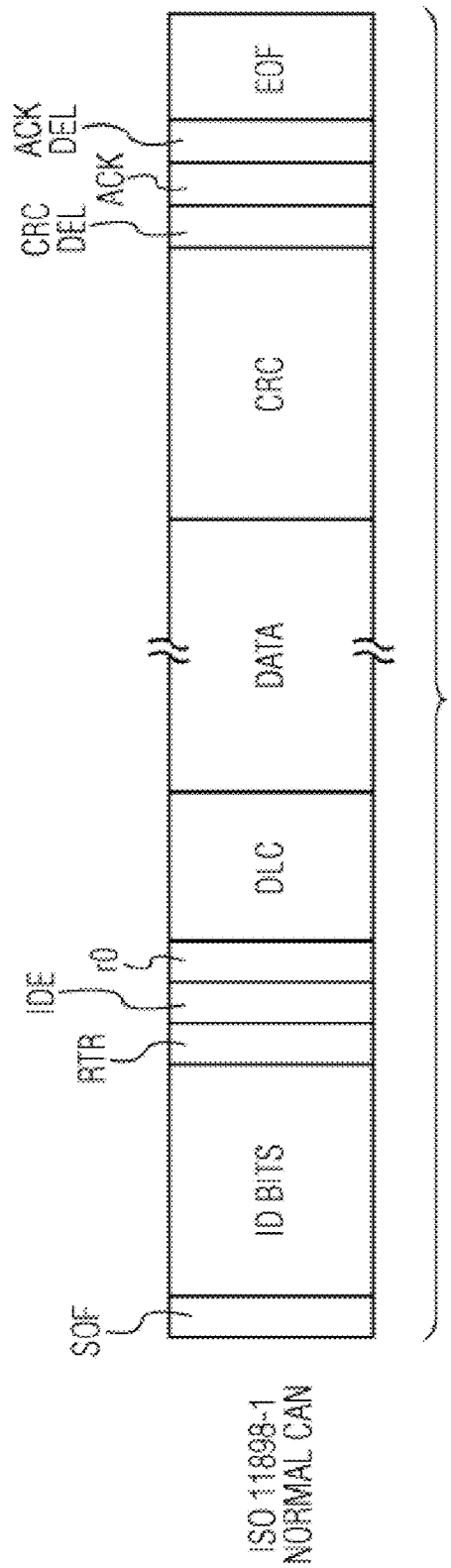
FIG. 2A depicts the format of an ISO 11898-1 frame that is used in CAN normal mode.
Figure 2B:
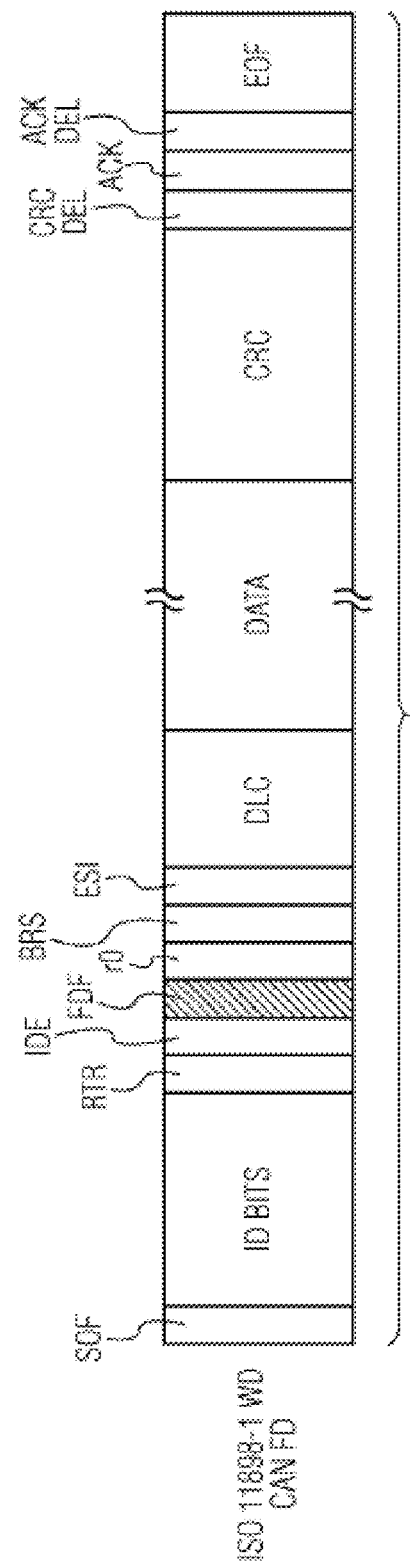
FIG. 2B depicts the format of an ISO 11898-1 frame that is used in CAN FD mode.

To provide additional details for an improved contextual understanding of the present disclosure, reference is now made to FIG. 2A which depicts the format of an ISO 11898-1 frame 201 (in the classic base frame format (CBFF)) that is used in CAN normal mode. In addition, reference also made to FIG. 2B which depicts the format of an ISO 11898-1 frame 202 (in the FD base frame format) that is used in CAN FD mode. As depicted, the fields of the CAN normal mode and CAN FD mode frames are defined as follows:

| | |
|---|---|
| SOF | Start of Frame (always dominant) |
| ID | Bits Identifier Bits, defining the message content |
| RTR | Remote transmission Request |
| IDE | ID Extension |
| r0 | Reserved Bit 0 (replaced by FDF in the CAN FD format) |
| FDF | FD Format (this is the bit distinguishing the frame formats) |
| BRS | Baud Rate Switch |
| ESI | Error State Indicator |
| DLC | Data Length Code |
| Data | Data Bytes |
| CRC | Cyclic Redundancy Check |
| CRC Del | CRC Delimiter (always recessive) |
| ACK | Acknowledge |
| ACK Del | Acknowledge Delimiter |
| EOF | End Of Frame |

In addition to the specified protocol fields, the frames may include one or more additional "stuff bits" to ensure enough transitions to maintain synchronization with the CAN frame which uses non-return to zero (NRZ) coding. With bit stuffing, the transmitter inserts a bit of opposite polarity after five consecutive bits of the same polarity. The stuffed data frames are destuffed by the receiver. All fields in the frame are stuffed except for the CRC delimiter, ACK field and End Of Frame which are a fixed size and are not stuffed. In the fields where bit stuffing is used, six consecutive bits of the same polarity (111111 or 000000) are considered an error.

An active error flag can be transmitted by a node when an error has been detected. The active error flag consists of six consecutive dominant bits and violates the rule of bit stuffing. Bit stuffing means that data frames may be larger than one would expect by simply enumerating the bits for the fields shown in the tables above. With CAN FD frames, bit stuffing uses a combination of fixed stuff bits and a counter that records the number of stuff bits inserted.

Figure 3A:
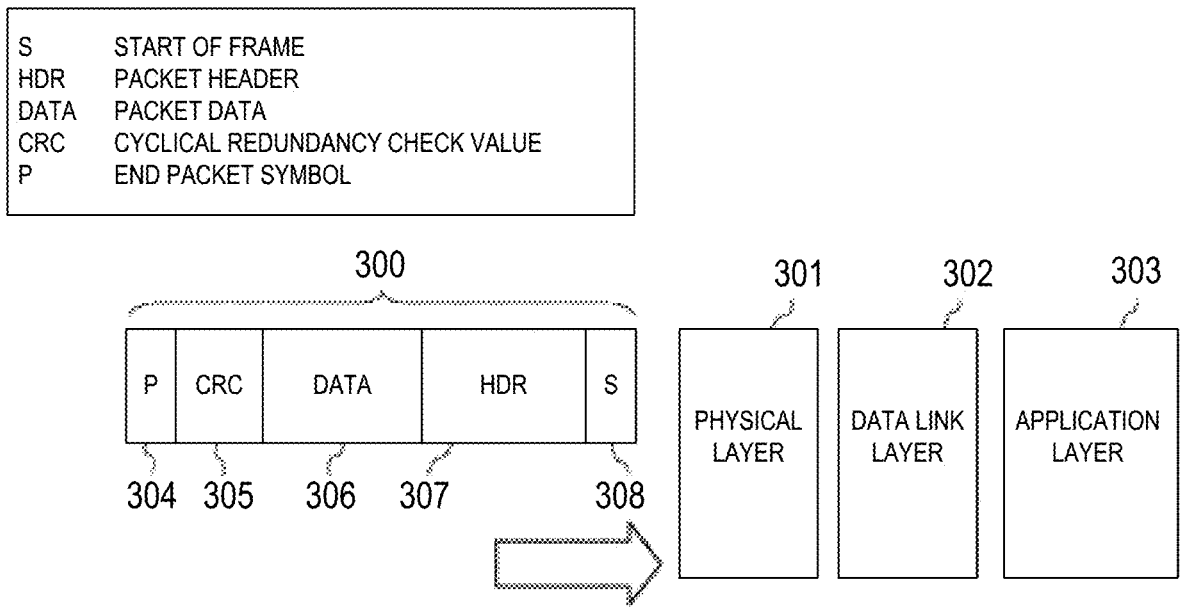
FIGS. 3A-C are schematic diagrams showing the process of receiving a packet at the physical layer according to the CAN communication protocol.
Figure 3B:
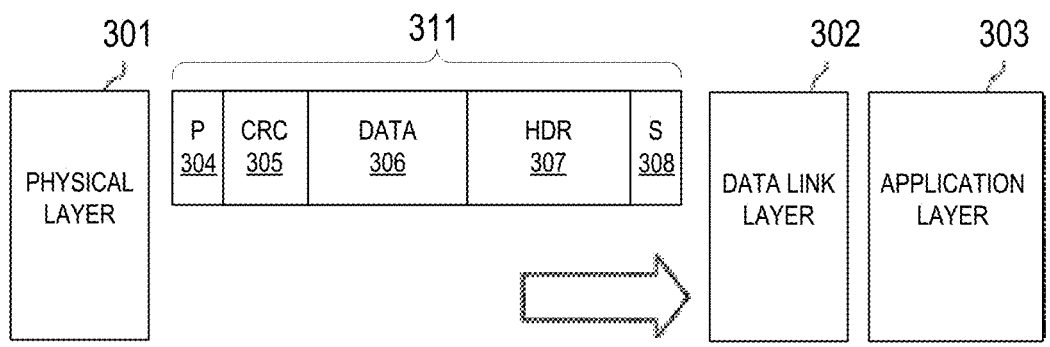
Figure 3C:
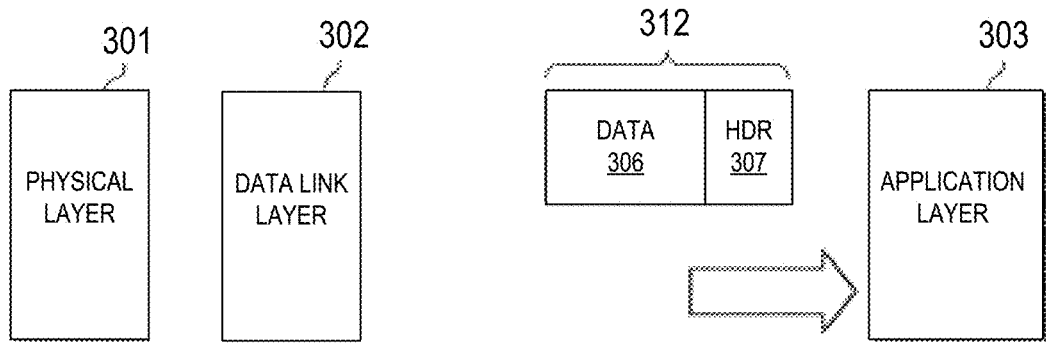

To illustrate some of the limitations and drawbacks from conventional data protection measures, reference is now made to FIGS. 3A-C which are schematic diagrams showing the conventional process of receiving a packet according to the applicable network communication protocol. As depicted, a received packet 300 moves through the communication protocol layers 301-303, starting with the physical layer device 301. As illustrated in these figures, the start of frame 308, header 307 (e.g., arbitration and control), data 306, CRC 305, and end of frame/packet symbol 304 portions of the packet 300 are consumed at each layer along the way to the host device. In particular, FIG. 3A shows the packet 300 when received by the physical layer 301. Within the physical layer 301, the start-of-frame 308 and end packet framing symbols 304 in the incoming data stream are recognized as part of the synchronization and the data between the framing symbols is passed up to the data link layer 302 for further processing.

FIG. 3B is a simplified flow diagram of a process where packet information is passed to the data link layer 302 which implements the CAN communication protocol. Within the data link layer 302, overall data integrity is verified by computing a CRC value from the bytes in the packet header and data sections of the packet. Within the data link layer 302, the protocol CRC 305 located at the end of the packet 311 is compared against its computed CRC value to verify data integrity. If the protocol CRC 305 matches the computed CRC, then the CRC 305 and Start of Frame field 308 are removed from the packet 311 by the data link layer 302, and the header 306 and data 307 sections of the packet are subsequently transferred to the application layer 303 for further processing.

FIG. 3C illustrates the process where the header 307 and data 306 information from the packet 312 is received by the application layer 303. At this point with conventional processing, the protocol CRC has been discarded, and is not available for use by the upper layer(s). Therefore, the discarded CRC is not available for integrity checking against any errors introduced to the data packet by the upper layer(s) (e.g., application layer). This can be problematic since data errors can be introduced as the data section 306 is processed by the microcontroller 110. For example, the process of loading the data section 306 into system memory of the microcontroller 110 may introduce errors in the data section 306.

Figure 4:
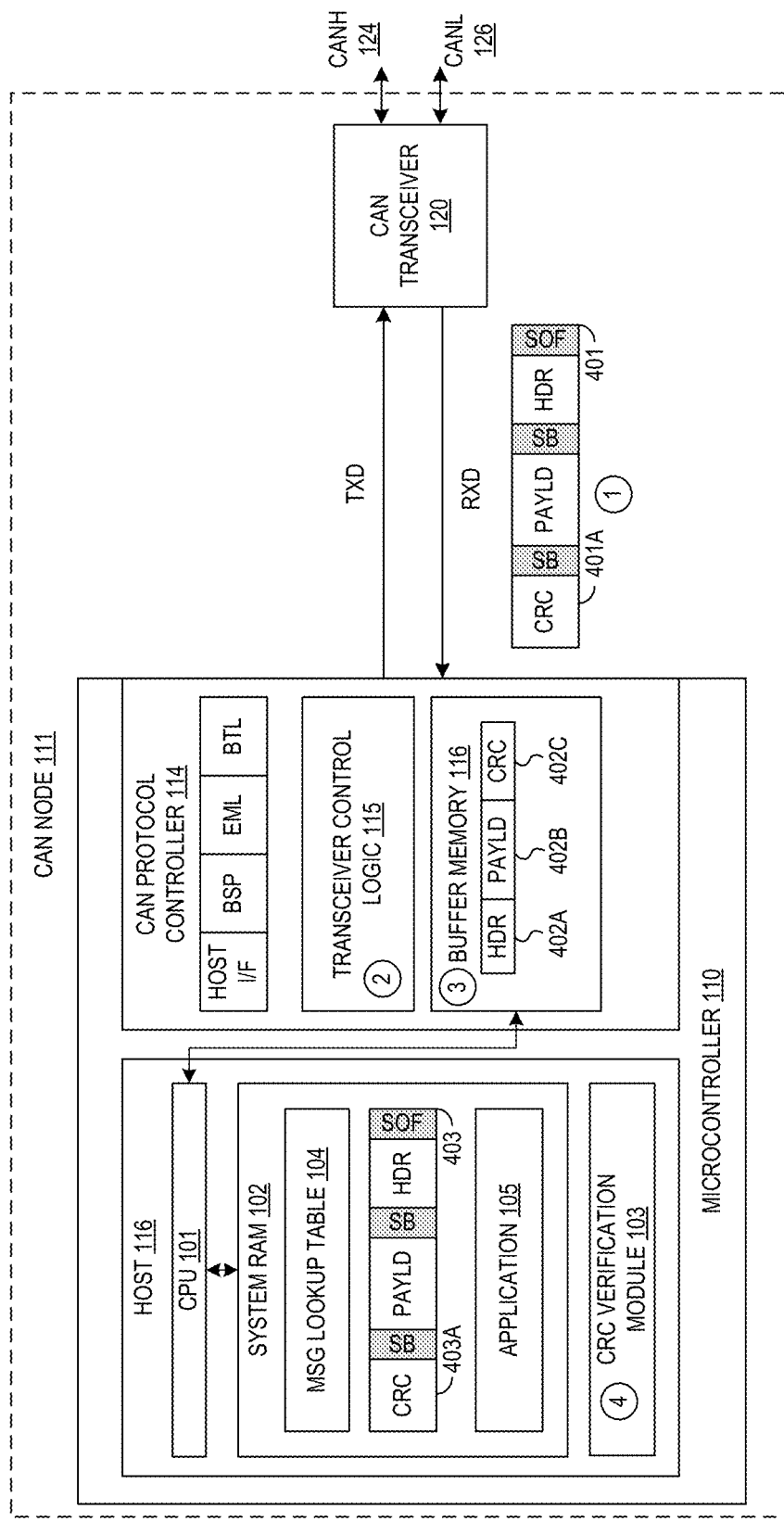
FIG. 4 illustrates a CAN node that is connected to receive data over one or more bus lines in accordance with selected embodiments of the present disclosure.

To address these deficiencies with conventional approaches and others known to those skilled in the art, there is disclosed herein a method and apparatus for using the protocol CRC 310 at to the application layer 306 to implement end-to-end protection of a CAN message at the host processor. In particular and with reference to FIG. 4, there is illustrated a CAN node 111 from FIG. 1 that includes a microcontroller 110 and CAN transceiver 120 that are connected to receive data over one or more bus lines 124, 126. In the depicted CAN node 111, data communicated from the microcontroller 110 to the CAN transceiver 120 is identified as transmit data (TXD) and data communicated from the CAN transceiver 120 to the microcontroller 110 is referred to as receive data (RXD). In turn, the CAN transceiver 120 communicates data to and from the CAN bus via the CANH and CANL bus lines 124 and 126, respectively.

In selected embodiments, the microcontroller 110 may include a host 116 that is connected to a CAN protocol controller 114. As depicted, the host 116 may include one or more cores or central processing units (CPU) 101 connected to a system memory 102 which stores a software application 105 for execution by processing circuits of the microcontroller 110. As described more fully hereinbelow, the host 116 also includes a CRC verification module 103 which is configured and/or connected for execution by the host CPU 101 to reconstruct and store a CAN data frame 403 (including a reconstructed CRC 403A) for comparison against a protocol CRC 402C to provide data integrity checking at the host 116.

To support the host-level integrity checking, the CAN protocol controller 114 may include transceiver control logic 115 and buffer memory 116 for implementing the data-link layer (DLL) processing of the CAN protocol, and for storing the header 402A, payload 402B, and protocol CRC 402C in the buffer memory 116. In addition, the CAN protocol controller 114 may include host interface logic which handles data transfers on the bus lines TXD, RXD, a bit stream processor (BSP) which handles the streaming of data between the buffer and bus lines, an error management logic (EML) which handles error management, and bit timing logic (BTL) which is responsible for synchronization of bit streams. Thus, the CAN protocol controller 114 can be configured to support the normal mode or the flexible data rate mode. As used herein, "CAN normal mode" (also referred to as "Classical CAN mode") refers to frames that are formatted according to the ISO 11898-1 standard and "CAN FD mode" refers to frames that are formatted according to the ISIO 11898-1 standard.

In receive operations, the microcontroller 110 and CAN transceiver 120 are configured and connected so that the host 116 can verify the received data frame at the application level by using the CAN protocol CRC 402C that is calculated and verified by the CAN protocol controller 114 when a CAN frame 401 is received. In a first step (1), a CAN frame 401 sent by the CAN transceiver 120 over received data line (RXD) will include a start-of-frame (SOF) field, an arbitration field, a header control field, a data payload field (if present), and a CRC code field 401A. In addition, one or more stuff bits and a stuff count (SB) may be included for CAN FD frames. In a second step (2), the CAN protocol controller 114 calculates a protocol CRC based on the bit stream from the CAN frame 401 that contains SOF, arbitration field, control field and data field (along with any stuff bits and a stuff count). If the calculated protocol CRC matches the CRC code field 401A from the CAN frame 401, the integrity of the frame 401 is verified over the physical media (wire), and the CAN protocol controller proceeds to the third step (3) where the header 402A, payload 402B, and protocol CRC 402A are stored or copied to the buffer memory 116. In selected embodiments, the CAN header 402A, payload 402B, and protocol CRC 402C are stored after removing the start-of-field and any stuff bit data. In this way, the protocol CRC 402C is made available to the host 116 when subsequently processing the data 402B for data integrity since the CPU processing element 101 can read the protocol CRC 402C from the buffer memory or register 116. In particular, the host 116 performs a fourth step (4) where the CRC verification module 103 reads the header 402A and data payload 402B from the buffer memory 116, along with the CRC 402A, and then reconstructs a CAN message 403 from the retrieved header 402A and data payload 402B before calculating a reconstructed CRC 403A. To determine which message/frames require additional integrity checks, the CRC verification module 103 may use a hardware lookup table 104 to quickly identify the frames to be protected by the protocol CRC. To this end, the lookup table 104 can indicate which messages require additional CRC verification by the host 116 and if the CAN frame 403 being reconstructed is a classic or FD. Using the retrieved header 402A and data payload 402B, the CRC verification module 103 reconstructs the CAN message 403 by calculating a CRC 403A from the header and payload portions and adding the correct number of stuff bits, stuff count and SOF. The host 116 then compares the reconstructed CRC 403A of the reconstructed CAN message 403 with the protocol CRC 402C retrieved from the buffer memory 116 to verify the data if there is a valid match. In the receive use case, the CRC code field 401A is added to the frame 401 by the transmitting node. As a result, when the receiving node host 116 verifies that the reconstructed CRC 403A matches the protocol CRC 402C (which matches the CRC code field 401A), the integrity of the message is checked from transmitting node to receiving node host 116.

Figure 5:
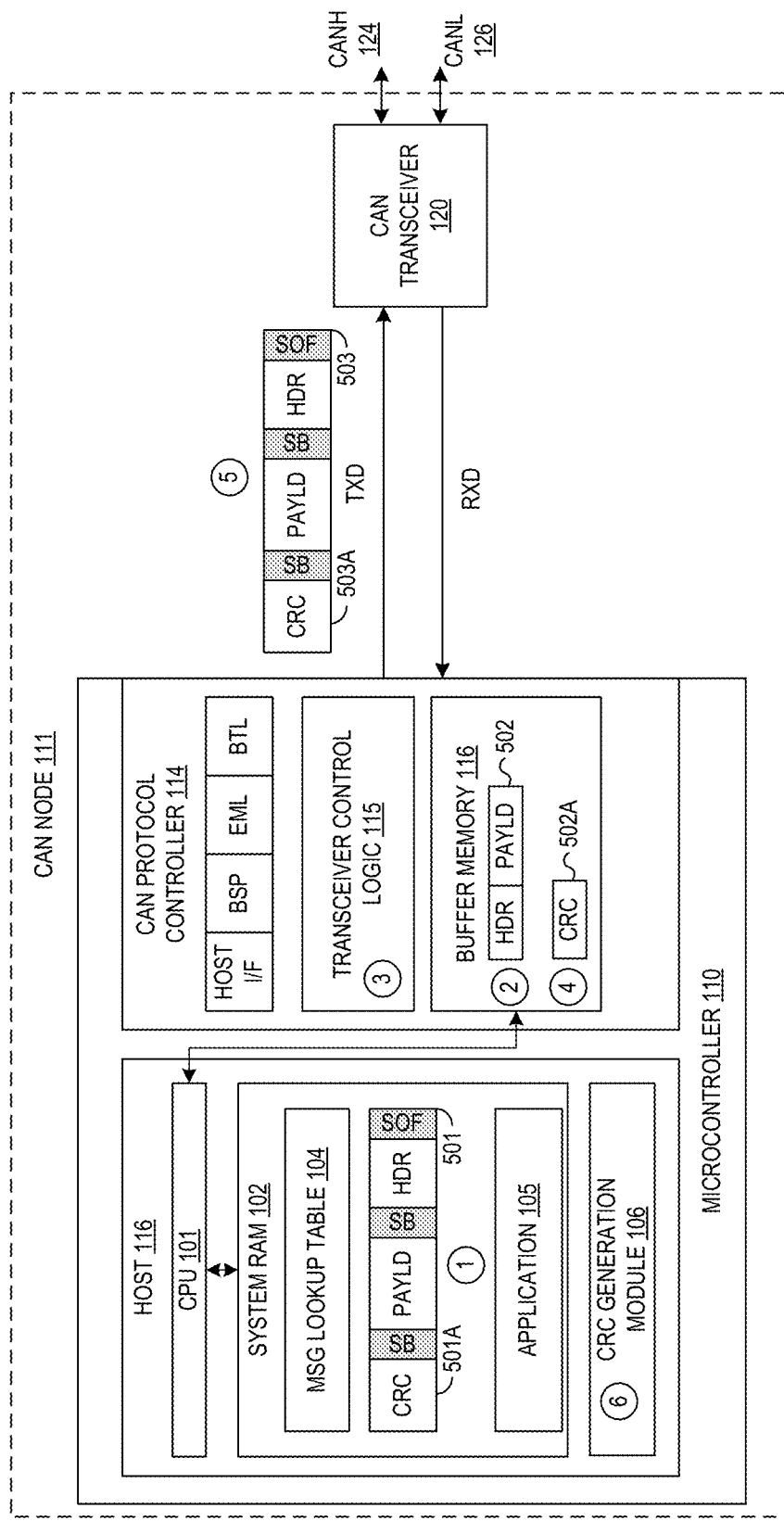
FIG. 5 illustrates a CAN node that is connected to transmit data over one or more bus lines in accordance with selected embodiments of the present disclosure.

In addition to providing end-to-end data verification on received CAN messages, selected embodiments of the present disclosure can be applied to check the integrity of CAN messages transmitted by the CAN node. In particular and with reference to FIG. 5, there is illustrated a CAN node 111 from FIG. 1 that includes a microcontroller 110 and CAN transceiver 120 that are connected to transmit data over one or more bus lines 124, 126. In the depicted CAN node 111, the microcontroller 110 controls the communication of data in a CAN data frame 503 over the transmit data (TXD) to the CAN transceiver 120 which formats the data frame 503 for transmission to the CAN bus via the CANH and CANL bus lines 124 and 126. Similar to the arrangement in FIG. 4, the microcontroller 110 includes a host 116 having one or more cores or central processing units (CPU) 101 connected to a system memory 102 which stores a software application 105. In addition, the host 116 includes a CRC generation module 106 which is configured and/or connected for execution by the host CPU 101 to pre-calculate and store a CAN data frame 501 (including a pre-calculated CRC 501A) for comparison against a protocol CRC 502C that is subsequently generated by the CAN protocol controller 114 to provide data integrity checking for transmitted frames at the host 116.

To support the host-level integrity checking of transmitted frames, the CAN protocol controller 114 may include transceiver control logic 115 and buffer memory 116 for implementing the data-link layer (DLL) processing of the CAN protocol whereby a header and data payload 502 to be transmitted are loaded in the buffer memory 116 and then used to calculate a protocol CRC 502A that is also stored in the buffer memory 116 for subsequent use in data verification. In particular, the transceiver control logic 115 may be configured to format the header and data payload 502 in either the normal CAN mode or the flexible data rate CAN mode for transmission as a transmit CAN frame 503 over the transmit data line (TXD) to the CAN transceiver 120. In the transmit formatting, the transceiver control logic 115 computes the protocol CRC 503A from the header and data payload 502 for the transmit CAN frame 503, and then stores a copy of the protocol CRC 502A in the storage in the buffer memory 116. In this way, the host 116 can compare the protocol CRC 502A to the pre-calculated CRC 501A to verify the integrity of the transmitted CAN frame 503. As will be appreciated, the CAN protocol controller 114 may include host interface which handles data transfers on the bus lines TXD, RXD, a bit stream processor (BSP) which handles the streaming of data between the buffer and bus lines, an error management logic (EML) which handles error management, and bit timing logic (BTL) which is responsible for synchronization of bit streams.

In transmit operations, the microcontroller 110 and CAN transceiver 120 are configured and connected so that the host 116 can verify the integrity of the transmitted header and payload data from the host 116 to the transmit CAN frame 503 by pre-calculating the CRC 501A for comparison to the CAN protocol CRC 502A that is calculated by the CAN protocol controller 114 when a CAN frame 401 is transmitted. In a first step (1), the host 116 constructs a complete transmit CAN frame 501. In particular, the CRC generation module 106 may construct a CAN frame 501 to include a start-of-frame (SOF) field, an arbitration field, a header control field, a data payload field (if present), and a CRC code field 501A. In addition, one or more stuff bits and a stuff count (SB) may be included for CAN FD frames. To determine which message/frames require additional transmit integrity checks, the CRC generation module 106 may use a hardware lookup table 104 to quickly identify the frames to be protected by the protocol CRC. The constructed CAN frame 501 is stored in the system memory 102 for subsequent use in verification processing. In a second step (2), the CAN protocol controller 114 loads the buffer memory 116 with the header and payload data 502 to be transmitted. This step may occur under control of an application 105 running on the host 116. In a third step (3), the CAN protocol controller 115 calculates a protocol CRC 503A based on the bit stream from the CAN frame 503 that contains SOF, arbitration field, control field and data field (along with any stuff bits and a stuff count). In a fourth step (4), the protocol controller 115 stores a copy of the protocol CRC 502A in the buffer memory 116. At step fifth step (5), the CAN protocol controller 114 transmits the transmit CAN frame 503 over the transmit data line (TXD) to the CAN transceiver 120. In a sixth step (6), the host 116 retrieves the protocol CRC 502A from buffer memory 116 for comparison with the pre-calculated CRC 501A by the CRC generation module 106 to verify the transmit data if there is a valid match. In the case of a CRC mismatch, the CRC verification module may signal a transmit error using any suitable mechanism. In the transmit use case, the host core 101 pre-calculates the CRC 501A and compares this with the protocol CRC 502A calculated by the CAN protocol controller hardware 114 at the point the frame is transmitted. This allows the integrity of the transmit frame 503 to be checked from host 116 to transmission on the wire TXD.

Figure 6:
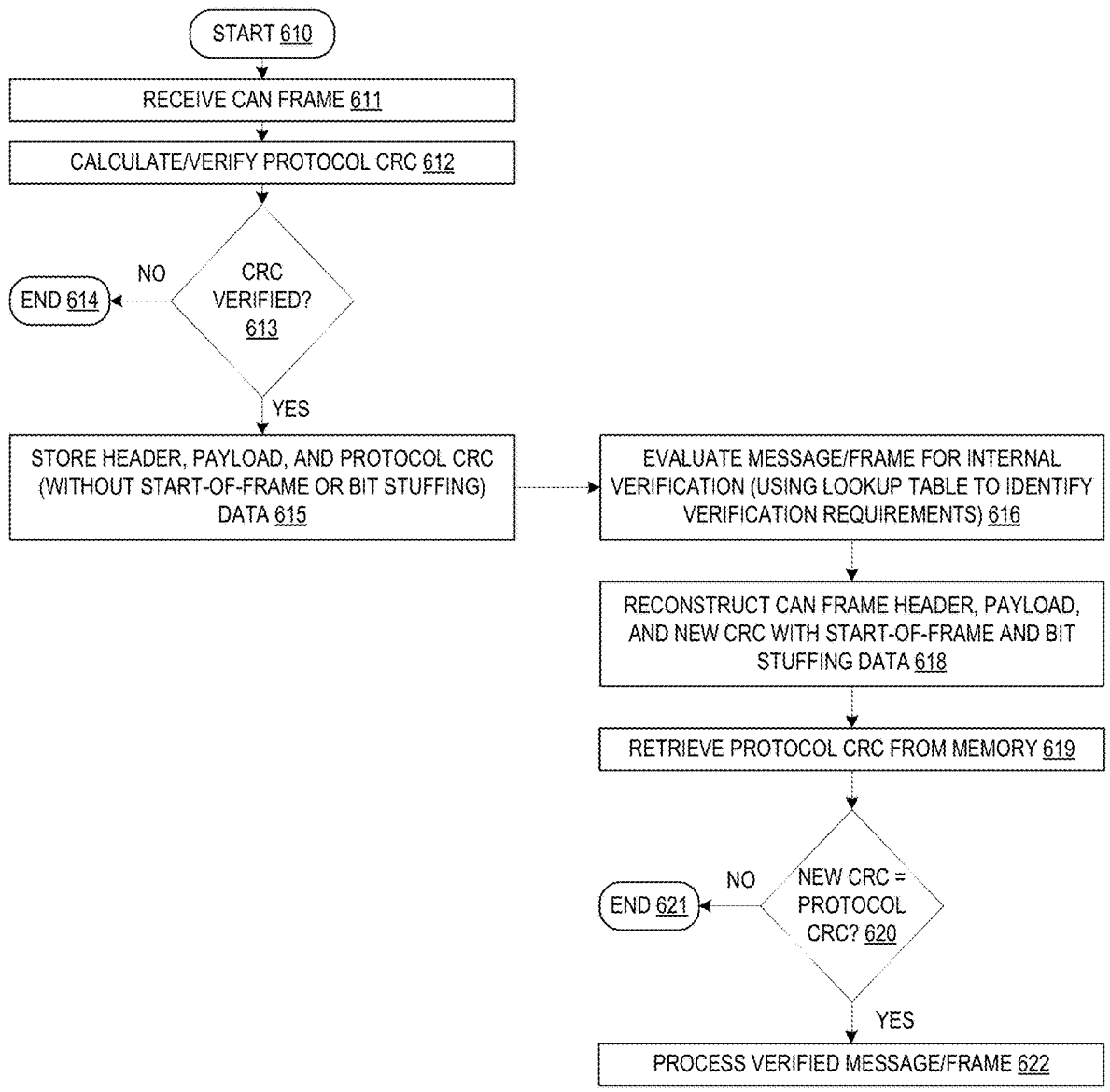
FIG. 6 depicts a simplified flow chart showing the logic for using a protocol CRC to implement data protection for a received CAN message in accordance with selected embodiments of the present disclosure.

Referring now to FIG. 6, there is depicted a simplified flow chart diagram 600 showing the logic for using a protocol CRC to implement data protection at the application level for a received CAN message that is verified at the physical wire level. In the flow diagram 600, different steps in the process may be implemented by system components having different levels of safety requirements such that some steps are performed by a first system component (e.g., CAN IP hardware 601) which requires a relatively low level of safety for data processing (e.g., ASIL B), while other steps are performed by a second system component (e.g., host core 602) which requires a high level of safety (e.g., ASIL D) for data processing.

After the method starts (step 610), a CAN frame is received (step 611), such as when the CAN protocol controller 601 receives CAN frame from the CAN transceiver. Based on information contained in the CAN frame, the CAN IP hardware 601 calculates a protocol CRC value for use in verifying the integrity of the CAN frame (step 612), where the protocol CRC may be calculated from the SOF, arbitration field, control field and data field portions of the received CAN frame. If the CAN IP hardware 601 determines that calculated protocol CRC does not match the CRC code in the CAN frame (negative outcome from step 613), then there is no CRC verification, and the process ends (step 614). However, if the calculated protocol CRC matches the CRC code in the CAN frame (affirmative outcome from step 613), then the data integrity is verified at the CAN data-link layer, at which point the CAN IP hardware 601 proceeds to store the header, data payload, and (matching) protocol CRC in memory (step 615). At step 615, the CAN IP hardware 601 may remove the start-of-frame bit and any bit stuffing data prior to memory storage. Thus, rather than discarding the protocol CRC when the frame is received, the CAN IP hardware 601 stores the protocol CRC in memory for subsequent use in verifying data integrity at the application level by the host core 602.

In particular, the message data from the CAN frame is evaluated for internal verification at the point of consumption by the host core 602 (step 616). In selected embodiments, the evaluation of the message data at step 616 may use a lookup table to identify the message verification requirements, such as which messages require additional host-level verification and whether bit stuffing is employed. For messages requiring additional host-level verification, the host core 602 is configured to reconstruct the received CAN frame by computing a new CRC value from the header, data payload, and to reconstruct the CAN from the header, data payload, and new CRC value, alone or in combination with the start-of-frame header and any required bit stuffing data (step 618). After retrieving the protocol CRC from memory (step 619), the host core 602 checks the reconstructed CRC value against the protocol CRC (step 620). If the host core 602 determines that new CRC does not match the protocol CRC retrieved from memory (negative outcome from step 620), then there is no CRC verification, and the process ends (step 621), such as by signaling a data verification error. However, if the new CRC matches the protocol CRC (affirmative outcome from step 620), then the data integrity is verified by the host at the application layer, at which point the host core 602 proceeds to process the verified message frame data (step 622). With the disclosed process 600, the host core 602 provides an additional integrity check of the received CAN frame without the need to embed a CRC in the payload of the frame.

Figure 7:
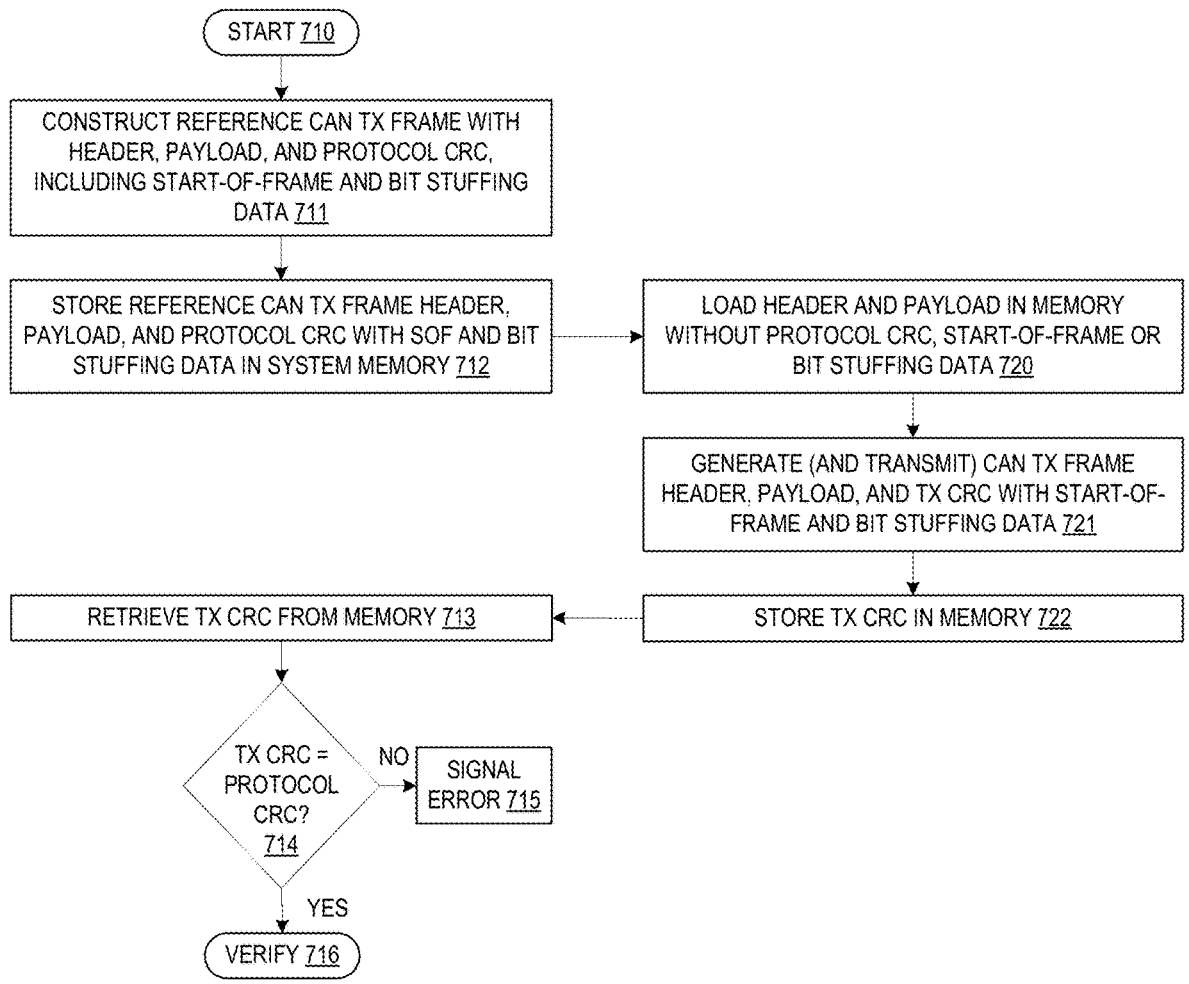
FIG. 7 depicts a simplified flow chart showing the logic for using a protocol CRC to implement data protection for a transmitted CAN message in accordance with selected embodiments of the present disclosure.

In addition to providing host-level verification of received CAN frames, selected embodiments of the present disclosure may be used to verify the integrity of transmitted CAN frames against any errors introduced between the host core and CAN bus. To provide additional details for an improved understanding of such embodiments, reference is now made to FIG. 7 which depicts a simplified flow chart diagram 700 showing the logic for using a protocol CRC to implement data protection at the application level for a transmitted CAN message. In the flow diagram 700, different steps in the process may be implemented by system components having different levels of safety requirements such that some steps are performed by a first system component (e.g., host core 701) which requires a relatively high level of safety for data processing (e.g., ASIL D), while other steps are performed by a second system component (e.g., CAN IP hardware core 702) which requires a relatively low level of safety (e.g., ASIL B or QM) for data processing.

After the method starts (step 710), the host core 701 constructs a reference CAN transmit frame (step 711) for the data to be transmitted. In constructing the reference frame, the host core 702 may include header, data payload, and a pre-calculated CRC value, alone or in combination with the start-of-frame header and any required bit stuffing data. Once constructed, the reference frame is stored in memory (step 612) for subsequent use in verifying the integrity of a transmitted CAN frame from the header and payload data. In this way, the host core 701 pre-calculates the CRC value for subsequent verification comparison against the protocol CRC calculated by the CAN IP hardware 702 at the point the frame is transmitted.

In particular, the CAN IP hardware 702 loads the memory with the header and payload to be transmitted (step 720). At this point in the transmission process, there is no start-of-frame or bit stuffing data. However, the CAN IP hardware 702 processes the header and payload data to generate and transmit the CAN transmit frame which includes the start-of-frame bit, header, payload, and transmit CRC, along with any required bit stuffing data (step 721). In selected embodiments, the CAN IP hardware 702 is configured to compute a transmit CRC value from the start-of-frame bit, header, and data payload, and to generate the CAN transmit frame to include the header, data payload, and transmit CRC value, alone or in combination with the start-of-frame header and any required bit stuffing data (step 721). Once calculated, the transmit CRC is stored in memory (step 722) for subsequent use by the host core 701 in verifying the integrity of a transmitted CAN frame.

In particular, after retrieving the transmit CRC from memory (step 713), the host core 701 checks the transmit CRC value against the protocol CRC (step 714). If the host core 701 determines that transmit CRC does not match the protocol CRC retrieved from memory (negative outcome from step 714), then there is no CRC verification, and a data verification error is signaled (step 715). However, if the transmit CRC matches the protocol CRC (affirmative outcome from step 714), then the data integrity is verified (step 716). With the disclosed process 700, the host core 701 provides a check of the data integrity from the host core 701 to the to transmission on the wire.

By now it should be appreciated that there has been provided an apparatus, method, program code, and system for processing packets received over Controller Area Network (CAN) interface. In the disclosed embodiments, a CAN protocol controller computes a cyclic redundancy check (CRC) value from header and payload values in a received CAN data frame, thereby verifying frame integrity of the received CAN data frame across a physical media layer. In selected embodiments, the CAN protocol controller verifies the frame integrity of the received CAN data frame across the physical media layer by computing a first CRC value from header and payload values in the received CAN data frame, and then comparing the first CRC value to the CRC value in the received CAN data frame to detect a match. In addition, the CAN protocol controller stores the header and payload values and CRC value in a memory buffer of the CAN protocol controller. In selected embodiments, the CAN protocol controller removes a start-of-frame bit and any stuff bits from the header and payload values and the CRC value before storing the header and payload values and the CRC value in the memory buffer. At a subsequent point when the payload values are consumed, a host controller computes a reconstructed CRC value from the header and payload values retrieved from the memory buffer. In selected embodiments, the host controller accesses a lookup table to determine if the CAN data frame requires frame integrity verification by the host controller. In selected embodiments, the host controller constructs a reconstructed CAN data frame which includes a start-of-frame bit, the header and payload values, and the reconstructed CRC value before inserting one or more stuff bits in the reconstructed CAN data frame. By comparing the reconstructed CRC value to the CRC value retrieved from the memory buffer, the host controller verifies the frame integrity of the received CAN data frame at a transaction layer.

In another form, there is provided an apparatus, method, program code, and system for transmitting packets over Controller Area Network (CAN) interface. In the disclosed embodiments, a host controller identifies or generates header and payload values to be transmitted, and then constructs a reference CAN data frame which includes header and payload values and a first cyclic redundancy check (CRC) value generated from at least the header and payload values to be transmitted. In selected embodiments, the host controller constructs the reference CAN data frame by inserting one or more stuff bits and a stuff count (SB) into the reference CAN data frame. In addition, the host controller stores at least the first CRC value in memory, alone or in combination with a copy of the header and payload values to be transmitted and any additional CAN frame requirements. In selected embodiments, the host controller stores the first CRC value as part of the reference CAN data frame which is stored in memory of the host controller along with a start of field frame, the header and payload values, and the one or more stuff bits and the stuff count (SB). Under control of the host controller, a copy of the header and payload values are loaded in a memory buffer of a CAN protocol controller. In selected embodiments, the host controller may load the copy of the header and payload values in the memory buffer of the CAN protocol controller without including the start of field frame, first CRC value or the one or more stuff bits and the stuff count (SB). In addition, a transmit CAN data frame is constructed which includes at least a protocol CRC value generated from at least the copy of the header and payload values to be transmitted. In selected embodiments, the protocol CRC value is stored in a memory buffer of the CAN protocol controller. In selected embodiments, the CAN protocol controller inserts, into the transmit CAN data frame, a start-of-frame field, the protocol CRC value, and any required stuff bits and stuff count (SB) values. In such embodiments, the CAN protocol controller may transmit the transmit CAN data frame and store a copy of the protocol CRC value in the memory buffer of the CAN protocol controller. Subsequently, the host controller compares the first CRC value to the protocol CRC value retrieved from the memory buffer, thereby verifying frame integrity of the transmit CAN data frame at an application layer. This may be performed when the host controller retrieves the first CRC value from memory of the host controller for comparison to the protocol CRC value retrieved from the memory buffer of the CAN protocol controller.

In yet another form, there is provided a Controller Area Network (CAN) device, method, program code, and system for transmitting packets. In the disclosed embodiments, the CAN device includes a CAN protocol controller connected between a host and a CAN transceiver interface to process packets received and/or transmitted over the CAN transceiver interface. In embodiments where the CAN device processes packets received over the CAN transceiver interface, the disclosed CAN protocol controller computes a cyclic redundancy check (CRC) value from header and payload values in a CAN data frame received over the CAN transceiver interface for storage in memory with the header and payload values, thereby verifying frame integrity of the received CAN data frame across a physical media layer. In selected embodiments, the CAN protocol controller computes a first CRC value from header and payload values in the received CAN data frame, and then compares the first CRC value to the CRC value in the received CAN data frame to detect a match. In addition, the disclosed host verifies the CRC value at an upper layer by computing a reconstructed CRC value from the header and payload values retrieved from memory and comparing the reconstructed CRC value with the CRC value retrieved from memory, thereby verifying frame integrity of the received CAN data frame at a transaction layer. In selected embodiments, the CAN protocol controller is configured to remove a start-of-frame bit and any stuff bits from the header and payload values and the CRC value before storing the header and payload values and the CRC value in memory. In addition, the host may be configured to construct a reconstructed CAN data frame comprising a start-of-frame bit, the header and payload values, and the reconstructed CRC value before inserting one or more stuff bits in the reconstructed CAN data frame. In addition, the host may be configured to access a lookup table to determine if the CAN data frame requires frame integrity verification by the host.

In selected embodiments where the CAN device processes packets for transmission over the CAN transceiver interface, the host is further configured to construct a second CRC value from transmit header and payload values and any start-of-frame bit and any stuff bits to be transmitted over the CAN transceiver interface and to store the second CRC value in memory. In such embodiments, the CAN protocol controller may be further configured to construct and store in a memory buffer a transmit CAN data frame comprising a second protocol CRC value generated from at least the copy of the transmit header and payload values and any start-of-frame bit and any stuff bits so that the host can compare the second CRC value to the second protocol CRC value retrieved from the memory buffer, thereby verifying frame integrity of the transmit CAN data frame at an application layer. In selected embodiments, the host may be further configured to construct a transmit reference CAN data frame comprising the transmit header and payload values and the second cyclic redundancy check (CRC) value. In such embodiments, the host may be further configured to insert one or more stuff bits and a stuff count (SB) into the transmit reference CAN data frame.

Techniques described herein can be applied to any type of In-Vehicle Networks (IVNs), including a CAN, a LIN, an Ethernet network, a FlexRay® compatible network, and other types of IVNs. Although a CAN device is described in some embodiments, it should be noted that the disclosure is not restricted to CAN devices. For example, the above-described techniques can be applicable to CAN, CAN-FD, and ISO 11898 compliant networks. The above-described techniques can also be implemented in a CAN device, such as a CAN transceiver IC device, a microcontroller IC device, or an IC device that includes both a CAN transceiver and a microcontroller.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD). Alternatively, embodiments of the disclosure may be implemented entirely in hardware or in an implementation containing both hardware and software elements. In embodiments which use software, the software may include but is not limited to firmware, resident software, microcode, etc.

Although the described exemplary embodiments disclosed herein focus on modifications to the CAN communication protocol and methods for using same, the present invention is not necessarily limited to the example embodiments illustrate herein and may be applied to any multi-layer communication system that uses CRC verification at lower, data-link layers so that additional data verification can be provided at the point of consumption in the upper application layers. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for processing packets received over Controller Area Network (CAN) interface, comprising:
   computing, at a CAN protocol controller, a cyclic redundancy check (CRC) value from header and payload values in a received CAN data frame, thereby verifying frame integrity of the received CAN data frame across a physical media layer;
   storing the header and payload values and CRC value in a memory buffer of the CAN protocol controller;
   computing, at a host controller, a reconstructed CRC value from the header and payload values retrieved from the memory buffer; and
   verifying frame integrity of the received CAN data frame at a transaction layer by comparing, at the host controller, the reconstructed CRC value to the CRC value retrieved from the memory buffer.

2. The method of claim 1, where verifying frame integrity of the received CAN data frame across the physical media layer comprises:
   computing, at the CAN protocol controller, a first CRC value from header and payload values in the received CAN data frame; and
   comparing, at the CAN protocol controller, the first CRC value to the CRC value in the received CAN data frame to detect a match.

3. The method of claim 1, further comprising removing a start-of-frame bit and any stuff bits from the header and payload values and the CRC value before storing the header and payload values and the CRC value in the memory buffer.

4. The method of claim 1, further comprising constructing, at the host controller, a reconstructed CAN data frame comprising a start-of-frame bit, the header and payload values, and the reconstructed CRC value before inserting one or more stuff bits in the reconstructed CAN data frame.

5. The method of claim 1, further comprising accessing, at the host controller, a lookup table to determine if the CAN data frame requires frame integrity verification by the host controller.

6. A method for transmitting packets over Controller Area Network (CAN) interface, comprising:
   constructing, at a host controller, a reference CAN data frame comprising header and payload values and a first cyclic redundancy check (CRC) value generated from at least the header and payload values to be transmitted;
   storing, by the host controller, at least the first CRC value in memory;
   loading a copy of the header and payload values in a memory buffer of a CAN protocol controller;
   constructing a transmit CAN data frame comprising a protocol CRC value generated from at least the copy of the header and payload values to be transmitted;
   storing the protocol CRC value in a memory buffer of the CAN protocol controller; and
   comparing, at the host controller, the first CRC value to the protocol CRC value retrieved from the memory buffer, thereby verifying frame integrity of the transmit CAN data frame at an application layer.

7. The method of claim 6, where constructing the reference CAN data frame comprises inserting one or more stuff bits and a stuff count (SB) into the reference CAN data frame.

8. The method of claim 7, where storing at least the first CRC value in memory comprises storing the reference CAN data frame in memory of the host controller comprising a start of field frame, the first CRC value, the header and payload values, and the one or more stuff bits and the stuff count (SB).

9. The method of claim 8, where the loading includes the host controller loading the copy of the header and payload values in the memory buffer of the CAN protocol controller without including the start of field frame, first CRC value or the one or more stuff bits and the stuff count (SB).

10. The method of claim 9, further comprising retrieving by the host controller the first CRC value from memory of the host controller for comparison to the protocol CRC value retrieved from the memory buffer of the CAN protocol controller.

11. The method of claim 6, further comprising inserting by the CAN protocol controller, into the transmit CAN data frame, a start-of-frame field, the protocol CRC value and any required stuff bits and stuff count (SB) values.

12. The method of claim 11, further comprising transmitting by the CAN protocol controller the transmit CAN data frame, where the CAN protocol controller stores a copy of the protocol CRC value in the memory buffer of the CAN protocol controller.

13. A Controller Area Network (CAN) device, the CAN device comprising:
a CAN protocol controller connected between a host and a CAN transceiver interface to process packets received and/or transmitted over the CAN transceiver interface, wherein the CAN protocol controller computes a cyclic redundancy check (CRC) value from header and payload values in a CAN data frame received over the CAN transceiver interface for storage in memory with the header and payload values, thereby verifying frame integrity of the received CAN data frame across a physical media layer; and
wherein the host verifies the CRC value by computing a reconstructed CRC value from the header and payload values retrieved from memory and comparing the reconstructed CRC value with the CRC value retrieved from memory, thereby verifying frame integrity of the received CAN data frame at a transaction layer.

14. The CAN device of claim 13, where the CAN protocol controller is configured to verify the frame integrity of the received CAN data frame across the physical media layer by:
computing a first CRC value from header and payload values in the received CAN data frame; and
comparing the first CRC value to the CRC value in the received CAN data frame to detect a match.

15. The CAN device of claim 13, where the CAN protocol controller is configured to remove a start-of-frame bit and any stuff bits from the header and payload values and the CRC value before storing the header and payload values and the CRC value in memory.

16. The CAN device of claim 13, where the host is configured to construct a reconstructed CAN data frame comprising a start-of-frame bit, the header and payload values, and the reconstructed CRC value before inserting one or more stuff bits in the reconstructed CAN data frame.

17. The CAN device of claim 13, where the host is configured to access a lookup table to determine if the CAN data frame requires frame integrity verification by the host.

18. A CAN device of claim 13, where the host is further configured to transmit packets over the CAN transceiver interface by constructing a second CRC value from transmit header and payload values and any start-of-frame bit and any stuff bits to be transmitted over the CAN transceiver interface and storing the second CRC value in memory; and
where the CAN protocol controller is further configured to construct and store in a memory buffer a transmit CAN data frame comprising a second protocol CRC value generated from at least the copy of the transmit header and payload values so that the host can compare the second CRC value to the second protocol CRC value retrieved from the memory buffer, thereby verifying frame integrity of the transmit CAN data frame at an application layer.

19. The CAN device of claim 18, where the host is further configured to construct a transmit reference CAN data frame comprising the transmit header and payload values and the second cyclic redundancy check (CRC) value.

20. The CAN device of claim 19, where the host is further configured to insert one or more stuff bits and a stuff count (SB) into the transmit reference CAN data frame.

* * * * *